Figure 1:
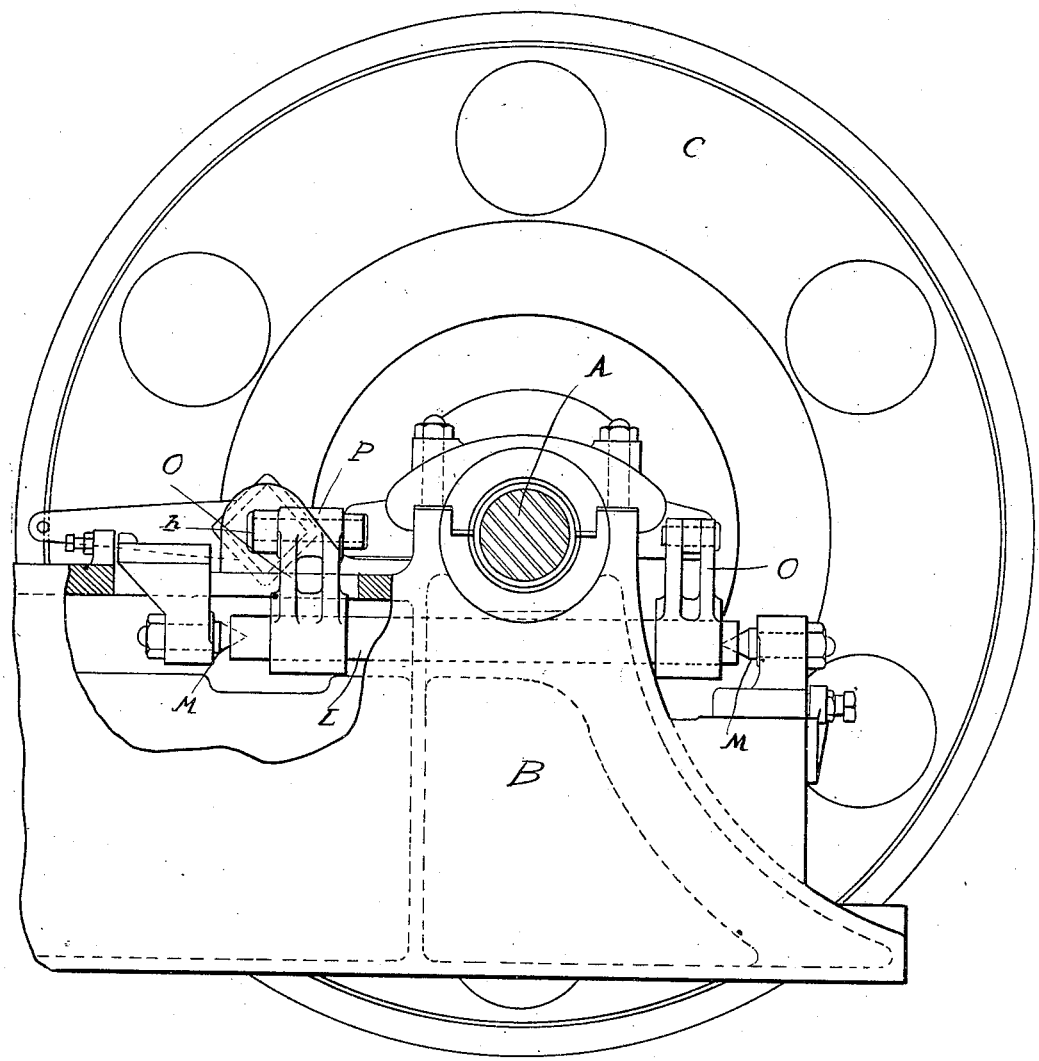

No. 897,044.

PATENTED AUG. 25, 1908.

A. J. WINEGAR.
CLUTCH MECHANISM.
APPLICATION FILED SEPT. 14, 1907.

3 SHEETS—SHEET 1.

WITNESSES

INVENTOR
ALBERT J. WINEGAR
By Whittemore Hulbert & Whittemore
attys

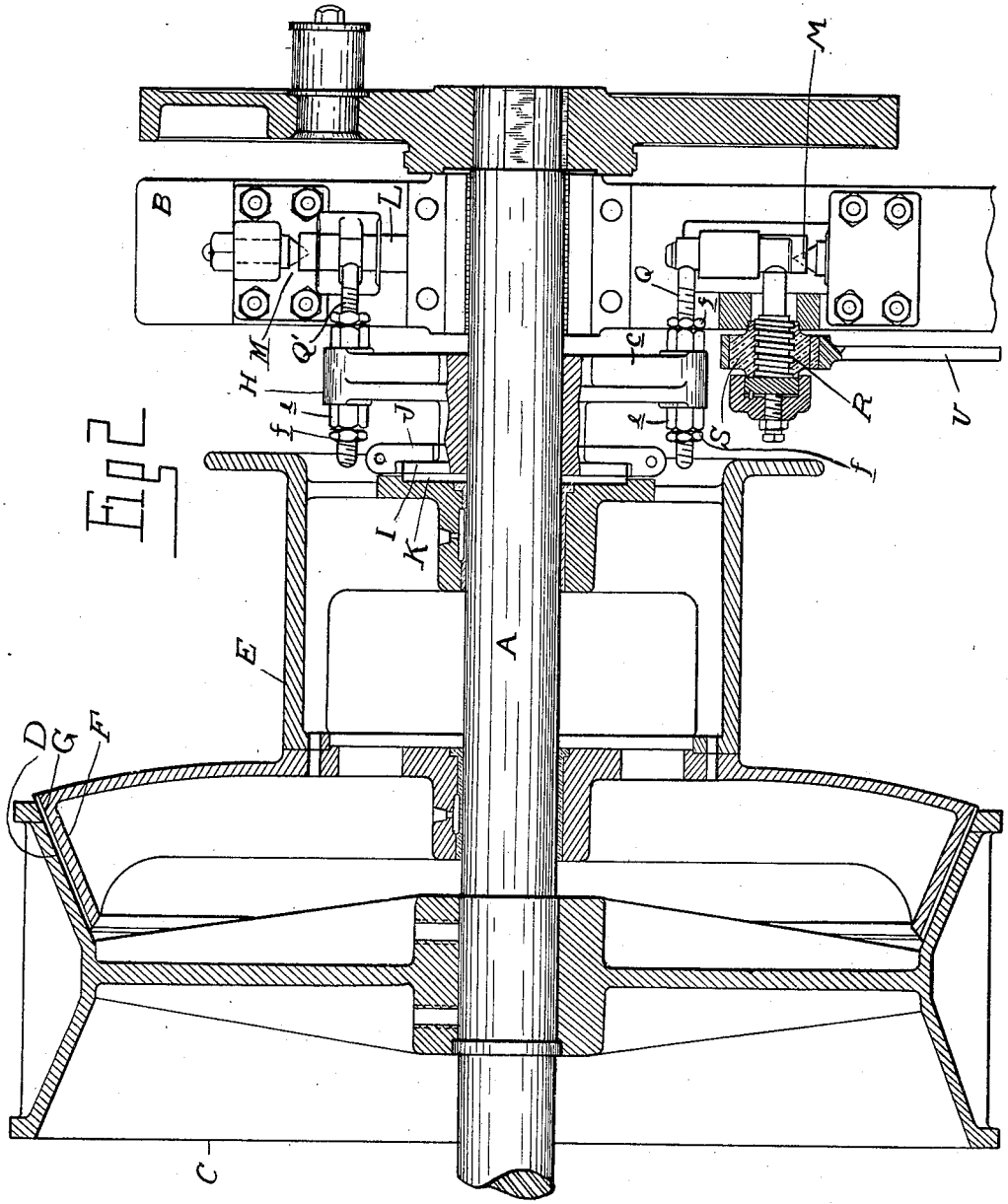

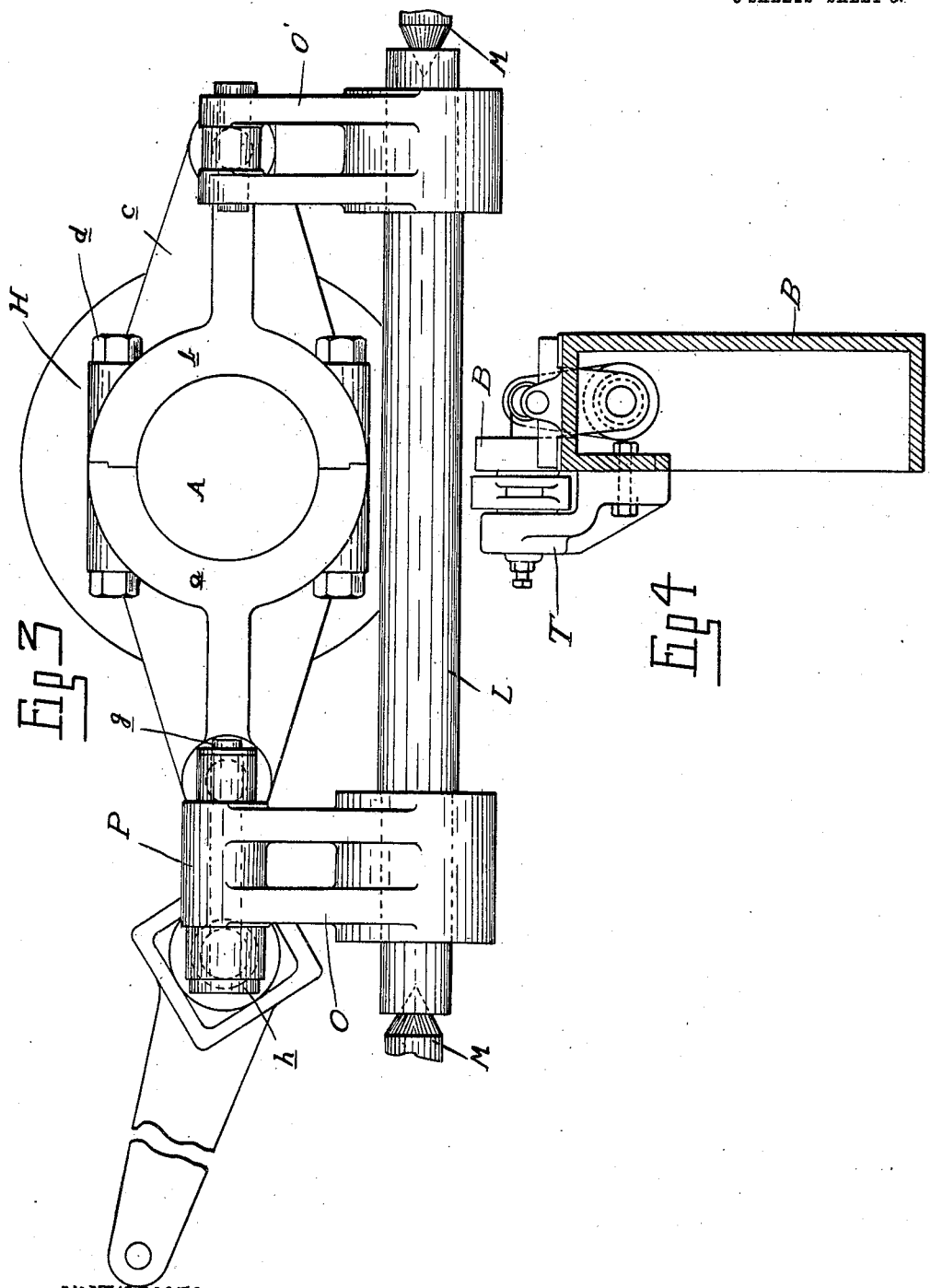

UNITED STATES PATENT OFFICE.

ALBERT J. WINEGAR, OF BELOIT, WISCONSIN, ASSIGNOR TO FAIRBANKS, MORSE & COMPANY, OF CHICAGO, ILLINOIS, A CORPORATION OF ILLINOIS.

CLUTCH MECHANISM.

No. 897,044.  Specification of Letters Patent.  Patented Aug. 25, 1908.

Application filed September 14, 1907. Serial No. 392,920.

*To all whom it may concern:*

Be it known that I, ALBERT J. WINEGAR, a citizen of the United States of America, residing at Beloit, in the county of Rock and State of Wisconsin, have invented certain new and useful Improvements in Clutch Mechanisms, of which the following is a specification, reference being had therein to the accompanying drawings.

The invention relates to certain new and useful improvements in clutch mechanisms, and consists in the novel construction thereof, and further in the peculiar arrangement and combination of its various parts, as more fully hereinafter described and specifically pointed out in the claims.

In the drawings,—Figure 1 is a view in side elevation of the clutch mechanism; Fig. 2 is a section therethrough showing some of the parts in elevation; Fig. 3 is a detail view, showing in elevation the major portion of the rocking mechanism and the thrust member operated thereby; and Fig. 4 is a detail view showing in elevation the supporting means for the thrust nut.

For the purpose of illustrating the invention I have shown the same in connection with a hoisting drum applied to a steam hoisting engine, in which A represents the engine shaft and B the frame.

C represents a rotary member fixed upon the shaft, preferably in the form of a drive wheel provided with a suitable annular friction surface, as D.

E designates the hoisting drum loosely sleeved upon the shaft A, and carrying an annular section F, provided with a friction surface G adapted upon the shifting of the drum towards the drive member to engage its friction surface, forming a locking engagement between the parts.

Loosely mounted upon the shaft A in proximity to the drum is a thrust member H, preferably in the form of a two-part ring, comprising the sections $a$ and $b$, each carrying an arm $c$, the ring parts being held together by suitable bolts $d$. The thrust member described is adapted to shift the drum, through suitable mechanism hereinafter described, into and out of frictional engagement with the drive member C, and for this purpose has a swivel connection with the drum, permitting the latter to rotate after engagement with the drive member independently of the ring and other parts of the clutch mechanism. The swivel connection is formed preferably by an annular flange I upon the ring and a corresponding flange J bolted to the drum, the arrangement of the parts being plainly indicated in Fig. 2. Interposed between the flange I and the drum is an antifriction washer K, the purpose of which is obvious.

For operating the thrust member, a rock mechanism is preferably employed adapted to be actuated in this instance by a single operating member U in the form of a lever. The mechanism comprises a rock shaft L supported on fixed pivots M and M mounted upon the frame B; lever arms O O' fixed upon said shaft, and bolts Q Q' pivoted respectively to the lever arms and connected preferably adjustably with the thrust member. The bolt Q' is pivoted between the furcations of the lever O', while the complementary bolt Q is pivoted upon a headed pin $g$ extending through the tubular bearing P in the outer end of the lever arm O. The bolt ends extend through suitable openings formed in the extremities of the arms $c$ of the thrust collar, and are adjustably held in place by nuts $e$ and lock nuts $f$, the adjustable connections affording means for taking up wear between the parts. The means for rocking the shaft consist preferably of a thrust screw R pivoted upon the pin $g$ intermediate its head $h$ and the lever O; a thrust nut S engaging the screw, and held between the frame B and a bracket arm T against endwise movement, and a lever U fashioned to engage the nut.

In Fig. 2 the parts of the clutch mechanism are shown as having been operated, the drum being in frictional engagement with the drive member C and rotating therewith independently of the thrust member through the agency of the swivel connection described. To release the drum, the lever U is turned in a direction to force the thrust screw outwardly from the nut, thereby rocking the rock shaft and shifting the thrust member, thus releasing the drum. The frictional engagement between the drum and drive member is obtained by a reverse movement of the operating lever.

While I have shown the clutch as applied to a hoisting drum of an ordinary hoisting engine, it will be obvious that it is susceptible of other uses, and I do not therefore desire to be limited to the particular use described; further, the operating lever U may be operated directly, or, if desired, through suitable connections to the operator's station.

What I claim as my invention is,—

1. In a clutch mechanism, the combination with a shaft, of two rotary members thereon respectively fixed and loose upon the shaft and adapted upon relative longitudinal movement to fixedly engage one with the other, a thrust member sleeved upon said shaft and swiveled to the loosely mounted member, a rock shaft connected to the thrust member, and means for actuating said shaft.

2. In a clutch mechanism, the combination with a shaft, of two rotary members thereon respectively fixed and loose upon the shaft, and adapted upon relative longitudinal movement to fixedly engage one with the other, a thrust member sleeved upon the shaft and swiveled to the loosely mounted member, a rock shaft transverse to said first-mentioned shaft, spaced operative connections between the rock shaft and said loosely mounted member, and means for rocking said shaft.

3. In a clutch mechanism, the combination with a shaft, of two rotary members thereon respectively fixed and loose upon the shaft, and adapted upon relative longitudinal movement to fixedly engage one with the other, a thrust member sleeved upon the shaft and swiveled to the loosely mounted member, a rock shaft, fixed operating members thereon, and connections between said members and the thrust member, and means for actuating the shaft.

4. In a clutch mechanism, the combination with a shaft, of two rotary members thereon respectively fixed and loose upon the shaft, and adapted upon relative longitudinal movement to fixedly engage one with the other, a thrust member sleeved upon the shaft and swiveled to the loosely mounted member, a rock shaft, complementary fixed levers thereon, and adjustable connections between said levers and the thrust member, and lever-controlled means for operating the rock shaft.

5. In a clutch mechanism, the combination with a shaft, of a drive wheel fixed thereon and provided with a friction surface, a drum loosely sleeved upon the shaft having a friction surface adapted to engage the corresponding surface upon the drive wheel upon relative longitudinal movement of the parts, a two-part thrust collar sleeved upon the shaft and swiveled to the drum, a rock shaft, adjustable operative connections between said shaft and the thrust collar, and means for operating the rock shaft.

6. In a clutch mechanism, the combination with a shaft, of two rotary members thereon respectively fixed and loose upon the shaft and adapted upon relative longitudinal movement to frictionally engage one with the other, a thrust member sleeved upon said shaft in operative relation to the loosely mounted member, a rock shaft, operative connections between said shaft and the thrust member, and means for rocking said shaft comprising a thrust nut held against endwise movement, a thrust screw engaging the nut and operatively connected to the rock shaft, and a lever for operating the nut.

7. In a clutch mechanism, the combination with a shaft, of two rotary members thereon respectively fixed and loose upon the shaft and adapted upon relative longitudinal movement to fixedly engage one with the other, a two-part thrust member upon said shaft swiveled to the loosely-mounted member, a rock mechanism for shifting the thrust member, including a rock shaft transverse to the first-mentioned shaft having operative connections with the loosely-mounted member, and means for actuating the rock mechanism.

8. In a clutch mechanism, the combination with a shaft, of two rotary members thereon respectively fixed and loose upon the shaft and adapted upon relative longitudinal movement to fixedly engage one with the other, a thrust member upon said shaft swiveled to the loosely-mounted member, a rock mechanism including a rock shaft, adjustable operative connections between the rock mechanism and the thrust member, and lever-controlled means for actuating the rock mechanism.

9. In a clutch mechanism, the combination with a shaft, of two rotary members thereon respectively fixed and loose upon the shaft adapted upon relative longitudinal movement to fixedly engage one with the other, a thrust member swiveled to the loosely mounted member, a rock shaft operatively connected to said thrust member, and means for rocking said shaft.

10. In a clutch mechanism, the combination with a shaft, of two rotary members thereon respectively fixed and loose upon the shaft and adapted to engage one with the other upon relative longitudinal movement, a thrust member upon said shaft having a swiveled connection with said loosely mounted member, means for shifting said member comprising a rock shaft transverse to the first mentioned shaft, adjustable operative connections between said shaft and thrust member, and means for operating said shaft comprising a thrust nut held against endwise movement, a thrust screw engaging the nut and operatively connected to the rock shaft, and a lever for actuating the thrust nut to positively engage and disengage the clutch.

11. In a clutch mechanism, the combination with a shaft, of two rotary members thereon respectively fixed and loose upon the shaft and adapted upon relative longitudinal movement to fixedly engage one with the other, a thrust member swiveled to the loosely mounted member, a rock shaft, adjustable operative connections between the thrust member and said rock shaft, and lever controlled means for operating the rock shaft whereby a movement of the lever in one direction will positively engage the clutch and a movement of the lever in the opposite direction will positively disengage the clutch.

In testimony whereof I affix my signature in presence of two witnesses.

ALBERT J. WINEGAR.

Witnesses:
C. B. RATHBUN.
L. A. COLE.